Jan. 10, 1933.  A. F. MILLER  1,893,867
QUACK GRASS DIGGER
Filed Dec. 23, 1931  3 Sheets-Sheet 2
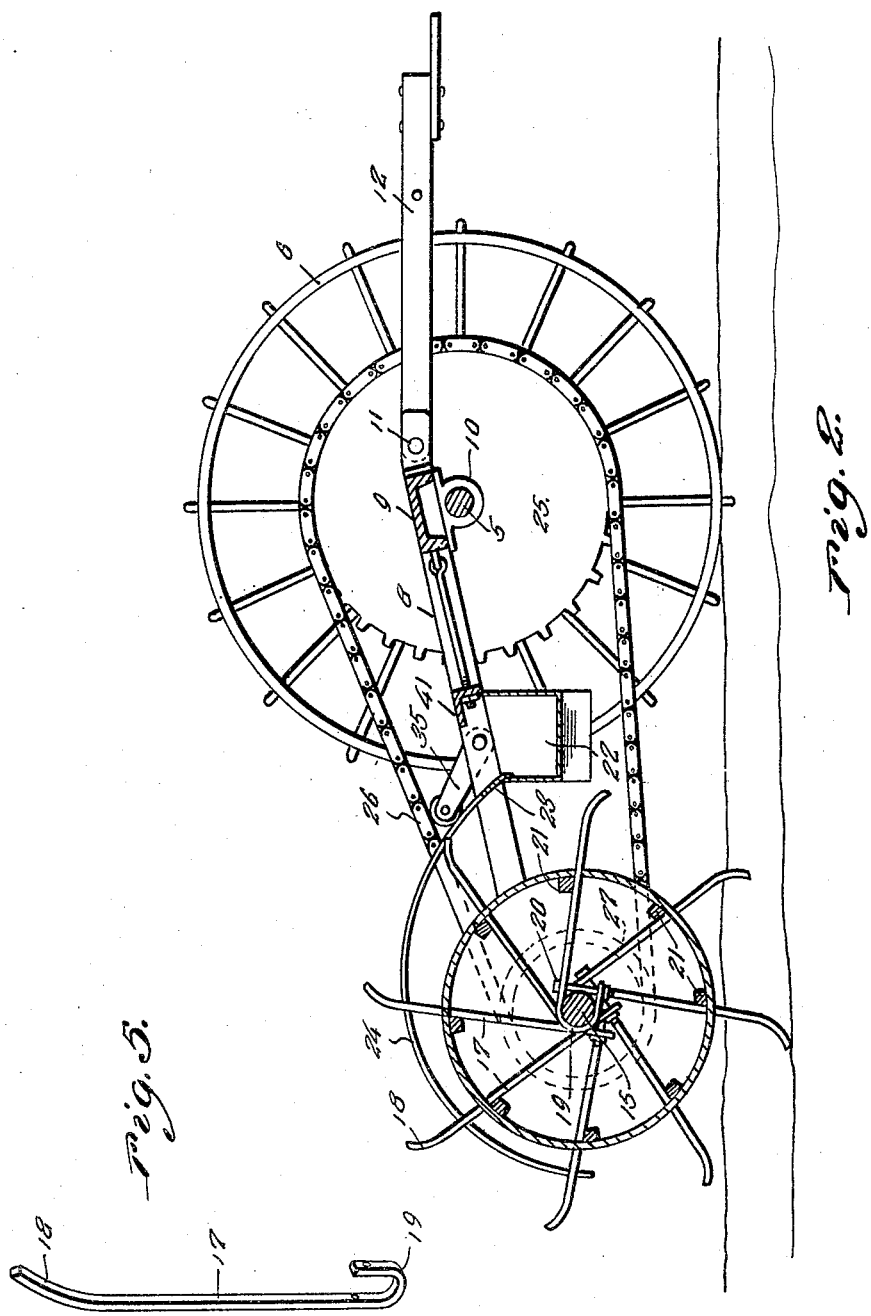
Inventor
Arthur F. Miller
By Clarence A. O'Brien
Attorney Jan. 10, 1933.   A. F. MILLER   1,893,867
QUACK GRASS DIGGER
Filed Dec. 23, 1931   3 Sheets-Sheet 3
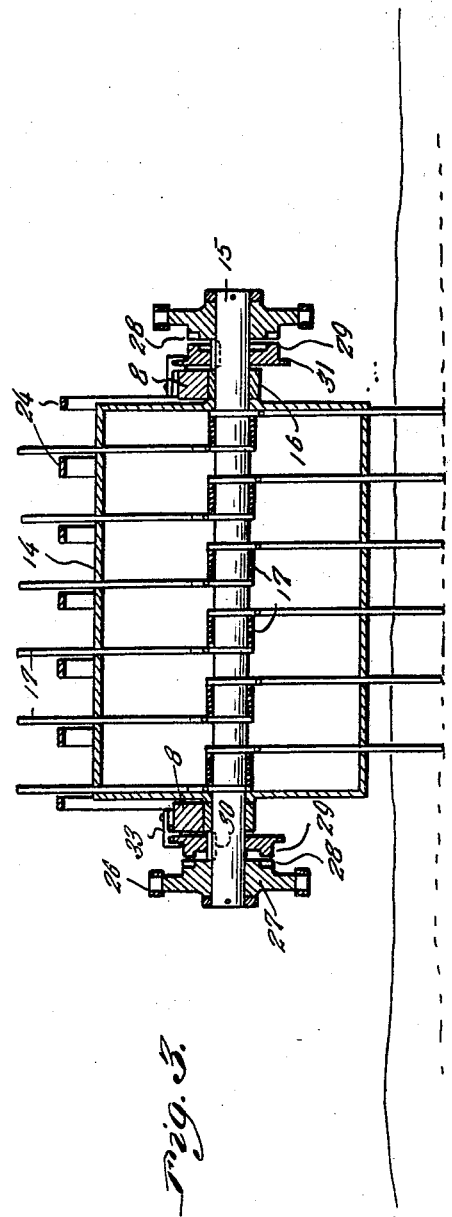
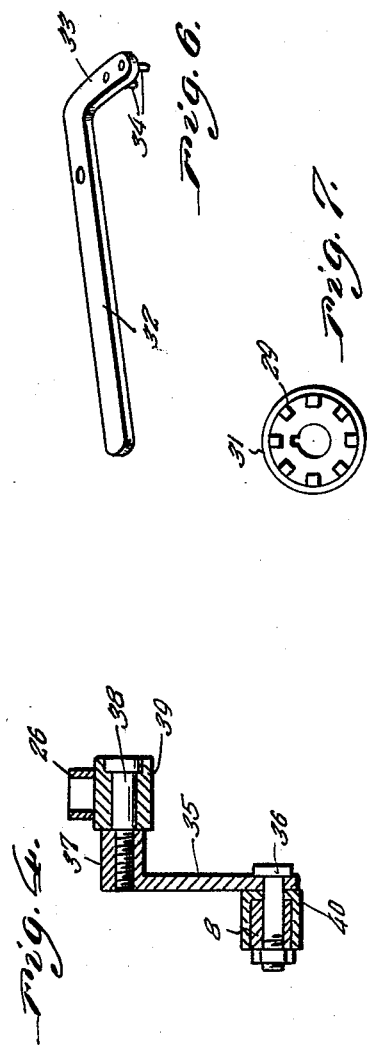
Inventor
Arthur F. Miller
By Clarence A. O'Brien
Attorney Patented Jan. 10, 1933

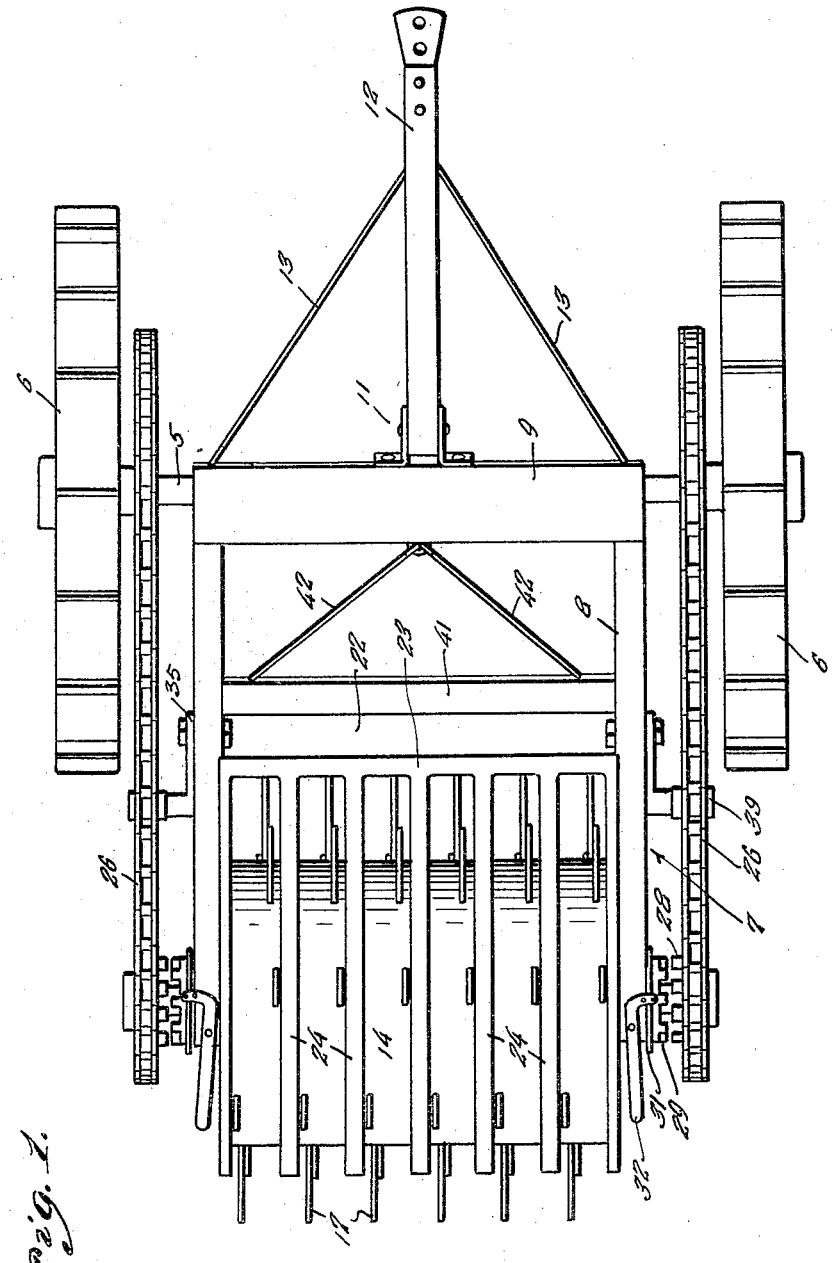

1,893,867

UNITED STATES PATENT OFFICE

ARTHUR F. MILLER, OF BARTLETT, ILLINOIS

QUACK GRASS DIGGER

Application filed December 23, 1931. Serial No. 582,839.

This invention relates to quack grass diggers, and in accordance with the present invention, there is provided a durable structure consisting of comparatively few parts, yet thoroughly efficient for uprooting or extracting from the soil as nearly as possible the root of any and all grasses, and particularly quack grass, further a device of this character embodying the feature of the present invention will require little cost in operation and upkeep, rendering it advantageous over the more or less complicated structures now in use, and being otherwise free of objectionable features which characterize the present quack grass diggers with which I am familiar.

The invention, together with its numerous objects and additional advantages will be apparent from a study of the following description, taken in connection with the accompanying drawings wherein:

Figure 1 is a top plan view of the digger.

Figure 2 is a longitudinal sectional elevational view therethrough.

Figure 3 is a transverse sectional view through the rear end of the device.

Figure 4 is a fragmentary sectional elevational view through one of the chain tighteners.

Figure 5 is a perspective view of a digging finger.

Figure 6 is a perspective view of a clutch control lever.

Figure 7 is a plan view of a shiftable clutch member.

My improved quack grass digger is adapted to be hitched to a tractor or like draft implement, and in the illustrated embodiment, comprises an axle 5 supported at its ends by lugged traction wheels 6. The axle 5 pivotally supports a substantially U-shaped frame 7, which includes spaced parallel side bars 8 and an end transverse bar 9 of channel shape in cross section, but which is preferably of a width greater than the width of the side bars 8. At the closed end thereof the frame 7 on its under side is provided with bearings 10 in which is journalled the axle 5.

To the bar 9 of frame 7 there is pivoted in any well known manner and as generally indicated at 11, a draft bar 12 that is braced with respect to the frame through the medium of brace rods 13. The draft bar 12 at its forward or free end is suitably provided to cooperate with a hitch structure on a tractor or the like.

Supported at the open end of the frame 7 is a digging device which in the present instance consists of a drum 14 mounted on a shaft 15 to rotate with the shaft. The shaft 15 is journalled in bearings 16 provided on the undersides of the frame bars 8. Extending radially from the drum 14 is a plurality of digging fingers 17 that are arranged in staggered relation.

As shown in Figure 5 each finger 17 is of considerable length, and is preferably formed of metal. At its outer, working or free end the finger 17 is offset as at 18, while at its inner end the finger is provided with a return bend 19. In actual practice, and as shown in Figure 2, the inner end of each finger embraces shaft 15 and is secured in engagement therewith by the medium of bolt and nut means 20 connecting opposed portions of the finger.

The fingers 17 extend through the drum 14 and are clamped or otherwise secured to longitudinal bars 21 arranged in a circular series internally of the drum and secured to the peripheral wall of the drum. (See Figure 2.)

It will be further noted that the ends 18 of the fingers are curved in the direction of rotation, and thus serve to raise the quack grass loosed from the soil, so that the roots may be conveyed to a suitable receptacle 22 provided therefor and arranged in advance of the drum as shown in Figure 2.

The receptacle or pan 22 for receiving the roots is supported between the frame bars 8 and the bottom of the pan as suggested in Figure 2 is inclined toward one end. The pan 22 at its deepest end may have its end wall removable to facilitate emptying of the pan.

There is also provided a concavo-convex guard member for the fingers 17, and this guard in the present instance comprises a bar 23 supported between the frame bars 8 adjacent the rear side of the pan 22 and inclined at an angle to the perpendicular as shown in Figure 2. Extending rearwardly from the upper edge of the bar 23 is a series of relatively spaced guard fingers 24, the latter being curved longitudinally and extending over the drum or toothed cylinder 14, and being further arranged in alternate relation with respect to the digging fingers 17. Thus it will be seen that as the roots are raised by the fingers 17 the roots are guided by the fingers 24 toward the pan 22 to be received by the latter.

The digging drum 14 is driven, when desired, from the axle 5, and to this end, there are provided on the axle 5 for rotation therewith, relatively large sprocket wheels 25 over which are trained endless chains 26 which latter are also trained over relatively smaller sprocket wheels 27 loose on shaft 15. Each of the sprockets 27 is provided on one side with a clutch element 28 with which is cooperable a clutch element 29 connected with the shaft 15 as at 30 in such a manner that the sprocket 29 will rotate with the shaft, but is also capable of longitudinal shifting movement relative to the shaft for movement into and out of engagement with the adjacent clutch 28.

Each clutch member 29 is provided with a circular flange or collar 31. For each clutch member 29 there is provided an actuating lever 32 that is pivoted adjacent one end to the proximate frame bar 8. Adjacent its pivoted end the lever 32 is provided with a lateral extension 33 which latter is provided with relatively spaced depending pins 34 arranged to laterally engage the flange 31 at relatively opposite sides of the flange so that upon pivotal movement of the lever 32 that such member 29 controlled by the lever will move therewith.

Manifestly, when clutches 29 are engaged with clutches 28 drive will be transmitted to the shaft 15 for rotating the drum.

For each chain 26 there is provided a tightener, which in the present instance consists of an arm 35 secured at one end by bolt and nut means 36 to a frame bar 8 and provided at its free end with a lateral internally threaded integral sleeve 37 with which is threadedly engaged the threaded end of a pintle 38. Journalled on the pintle 38 is a roller 39 having bearing contact with one run of the proximate chain 26. (See Figure 4.) Obviously through the medium of the nut and bolt means 36, arm 35 may be secured at the desired angular adjustment as required for taking up slack in a chain 26. A substantially U-shaped wear sleeve 40 embraces the frame member 8 and at its closed side the sleeve is provided with an aperture for accommodating the bolt of the means 36.

Referring again to the structure of the frame 7, it will be noted, that adjacent the closed end of the frame, the bars 8 are braced by a cros bar 41, which in turn is braced with respect to the frame member 9 through the medium of tie rods 42.

In actual practice, it will be apparent that the quack grass digger will be hitched to a tractor or suitable draft device, and with the clutches 29 engaging clutches 28, drive will be transmitted to the drum 14 as the digger is propelled by the tractor. The drum 14 will rotate in a clockwise direction, and the curved working ends 18 of the fingers will pass into the soil, separate and loose the quack grass from the soil, and will also serve to carry the roots upwardly to be directed as hereinbefore described to the pan 22 thus reducing to a minimum, the scattering of the loosened roots. The frame 7 being pivoted, will of course be free to rotate so that in the event the fingers encounter a hard or immovable object, the possibility of the fingers becoming broken is reduced to a minimum.

Even though I have herein shown and described the preferred embodiment of the invention, it is to be understood that I do not wish to limit myself to the precise details, construction and arrangement of elements as herein shown, but accordingly claim all such forms of the invention to which I am entitled, I intending in no wise to restrict the invention beyond the requiremets of the prior art and scope of the appended claims.

Having thus described my invention, what I claim as new is:

1. In a quack grass digger, in combination, an axle, wheels supporting the axle, a frame pivotally mounted on the axle at one end of the frame, a revoluble combined digger and elevating device supported on the free end of the frame, a receptacle mounted transversely of the frame between the ends of the latter, and a concavo-convex guard member extending over the digging and elevating device and arranged to direct the elevated material to the receptacle.

2. In a machine of the class described, in combination, an axle, wheels supporting the axle, a frame pivotally connected at one end with the axle, a shaft journalled transversely of the frame, a toothed cylinder on the shaft for rotation therewith, a receptacle mounted transversely of the frame in advance of said cylinder, a transverse series of relatively spaced guard fingers extending rearwardly from one side of the receptacle, each of said fingers being longitudinally curved, means for driving said shaft from said axle, and including clutches for connecting said means with said shaft, and a draw bar extending forwardly from said frame.

In testimony whereof I affix my signature.

ARTHUR F. MILLER.